US010899547B1

(12) United States Patent
Roth et al.

(10) Patent No.: US 10,899,547 B1
(45) Date of Patent: Jan. 26, 2021

(54) COUPLING BLOCK ON A CONVEYOR SYSTEM

(71) Applicant: INTELLIGRATED HEADQUARTERS, LLC, Mason, OH (US)

(72) Inventors: Eric Roth, West Chester, OH (US); John Williams Rugh, Terrace Park, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/690,646

(22) Filed: Nov. 21, 2019

(51) Int. Cl.
   *B65G 21/10* (2006.01)
   *B65G 13/07* (2006.01)
   *B65G 23/14* (2006.01)
   *B65G 13/12* (2006.01)

(52) U.S. Cl.
   CPC .......... *B65G 21/10* (2013.01); *B65G 13/07* (2013.01); *B65G 23/14* (2013.01); *B65G 13/12* (2013.01); *B65G 2207/30* (2013.01); *B65G 2812/02019* (2013.01)

(58) Field of Classification Search
   CPC ........ B65G 21/10; B65G 23/14; B65G 13/07; B65G 13/12; B65G 2812/02019; B65G 2207/30; B65G 21/22; B65G 2812/0239
   USPC ..................................................... 198/781.03
   See application file for complete search history.

(56) References Cited

U.S. PATENT DOCUMENTS

| 4,109,782 A * | 8/1978 | Nakai ................. B65G 47/261 198/781.03 |
| 4,259,907 A | 4/1981 | Schuck |
| 4,266,659 A * | 5/1981 | Meyer ................. B65G 47/261 198/781.03 |
| 4,341,546 A * | 7/1982 | Nitschke ............... C03B 35/186 65/163 |
| 4,345,684 A * | 8/1982 | Rolland ............... B65G 47/261 198/781.09 |
| 4,458,809 A * | 7/1984 | White .................... B65G 13/07 198/789 |
| 4,721,203 A * | 1/1988 | Kimball ............... B65G 47/261 198/781.01 |
| 4,753,339 A * | 6/1988 | Vogt ...................... B65G 13/07 198/781.03 |
| 4,958,723 A * | 9/1990 | Bonifer ................ B65G 47/261 198/781.09 |
| 5,156,260 A | 10/1992 | Dorner et al. |
| 5,984,083 A | 11/1999 | Hosch et al. |

(Continued)

FOREIGN PATENT DOCUMENTS

DE 4226414 C1 1/1994
EP 0493938 A1 7/1992

*Primary Examiner* — Mark A Deuble
(74) *Attorney, Agent, or Firm* — Alston & Bird LLP

(57) ABSTRACT

A coupling block is provided to dynamically adjust a difference in height between a first support structure and a second support structure attached to a conveyor frame. The coupling block includes at least one rotating cam attached to the coupling block. The rotating cam is actuated to move at least a portion of the coupling block about an axis to compensate for a height difference between the first support structure and the second support structure. A cam adjuster is also accessible from an outer face of the of the conveyor frame to change a direction of rotation of the at least one rotating cam.

20 Claims, 9 Drawing Sheets

(56) References Cited

U.S. PATENT DOCUMENTS

| | | | | |
|---|---|---|---|---|
| 6,530,468 B2* | 3/2003 | Fischer-Jensen | ...... | B65G 23/12 |
| | | | | 198/779 |
| 2003/0047423 A1* | 3/2003 | Youn | ...................... | B65G 13/07 |
| | | | | 198/790 |
| 2007/0034488 A1* | 2/2007 | Chiu Chen | ............ | B65G 13/12 |
| | | | | 198/861.1 |

* cited by examiner

COUPLING BLOCK ON A CONVEYOR SYSTEM

TECHNOLOGICAL FIELD

The present disclosure relates generally to a conveyor system formed by multiple conveyor sections, and, more particularly, to a conveyor system which includes coupling blocks at the multiple conveyor sections of the conveyor system.

BACKGROUND

Generally, conveyors are a part of material handling systems capable of transporting goods from one location to another location in a warehouse environment. These conveyors may fall under many broad categories depending upon their functions, such as accumulation conveyors, merger conveyors, sortation conveyors and so on. Often, these conveyors may be belt-driven or chain-driven. Generally, the chain or belt driving these conveyors are installed below a top conveying run of the conveyors usually formed by conveyor rollers or conveyor slats. Often, the chain or belt is installed to run over a full length of the conveyors and there are numerous challenges faced during the installation and maintenance of the chain or belt.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a conveyor system. The conveyor system includes a conveyor bed, wherein the conveyor bed includes a conveyor side frame, a first support structure and a second support structure that are each attached to the conveyor frame and a driving member supported on the first support structure and the second support structure. The conveyor bed includes a coupling block positioned in between the first support structure and the second support structure to support the driving member. The coupling block includes at least one rotating cam attached to the coupling block, wherein the rotating cam is actuated to rotate the coupling block about an axis to compensate for a height difference between the first support structure and the second support structure.

Various example embodiments described herein relate to a conveyor system with the at least one rotating cam including a cam adjuster accessible from an outer face of the conveyor side frame.

Various example embodiments described herein relate to a conveyor system with the cam adjuster configured to rotate the cam in one of a clockwise or anticlockwise direction.

Various example embodiments described herein relate to a conveyor system with the coupling block configured to move vertically upwards and downwards with respect to one of the first support structure and the second support structure in response to the rotation of the at least one rotating cam.

Various example embodiments described herein relate to a conveyor system with the coupling block attached to the conveyor side frame using a fastener, wherein the fastener is at least one of a nut, bolt or a washer.

Various example embodiments described herein relate to a conveyor system with the driving member being one of a drive chain or a drive belt.

Various example embodiments described herein relate to a coupling block to dynamically adjust a difference in height between a first support structure and a second support structure attached to a conveyor frame. The coupling block includes at least one rotating cam attached to the coupling block, wherein the rotating cam is actuated to move at least a portion of the coupling block about an axis to compensate for a height difference between the first support structure and the second support structure. A cam adjuster accessible from an outer face of the conveyor frame to change a direction of rotation of the at least one rotating cam.

Various example embodiments described herein relate to a coupling block with the at least one rotating cam being an eccentric cam with the coupling block as a follower that moves vertically up or down in response to a rotation of the eccentric cam.

Various example embodiments described herein relate to a coupling block including at least one linear slot and at least one substantially circular slot provided on an outer face of the coupling block.

Various example embodiments described herein relate to a coupling block with the at least one rotating cam positioned within the substantially circular slot with a clearance such that the cam is capable of rotation within the slot.

Various example embodiments described herein relate to a coupling block with the cam adjuster being actuated using an external motor to change a direction of rotation of the rotating cam.

Various example embodiments described herein relate to a coupling block being actuated to rotate the at least one rotating cam in a clockwise direction or an anti-clockwise direction.

Various example embodiments described herein relate to a coupling block, wherein the first support structure and the second support structure supports a driving member.

Various example embodiments described herein, relates to a coupling block, wherein the driving member is one of a drive chain, a drive belt or a drive roller.

Various example embodiments described herein relate to a coupling block supporting a portion of the driving member when installed in the conveyor frame.

Various example embodiments described herein relate to a coupling block being substantially rectangular in cross section.

Various example embodiments described herein relate to a method for compensating for a height difference in a first chain support structure and a second chain support structure of a conveyor system. The method includes rotating a rotating cam attached to a coupling block in one of a first direction or a second direction, wherein the coupling block is positioned in between the first chain support structure and the second chain support structure. The method further includes moving a first end of the coupling block upward and a second end of the coupling block downward in response to rotating the rotating cam in the first direction. Further, moving the first end of the coupling block downward and the second end of the coupling block upward in response to rotating the rotating cam in the second direction. The upward and downward movement of the coupling block in response to the rotation of rotating cam compensates the height difference between the first chain support structure and the second chain support structure.

Various example embodiments described herein relate to a method, wherein the first direction is a clockwise direction and the second direction is an anti-clockwise direction.

Various example embodiments described herein relate to a method including operating a cam adjuster using an external motor to change a direction of rotation of the rotating cam.

Various example embodiments described herein relate to a method including rotating the cam adjuster from outside of a conveyor frame of the conveyor system supporting the first chain support structure and the second chain support structure to actuate the rotating cam.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
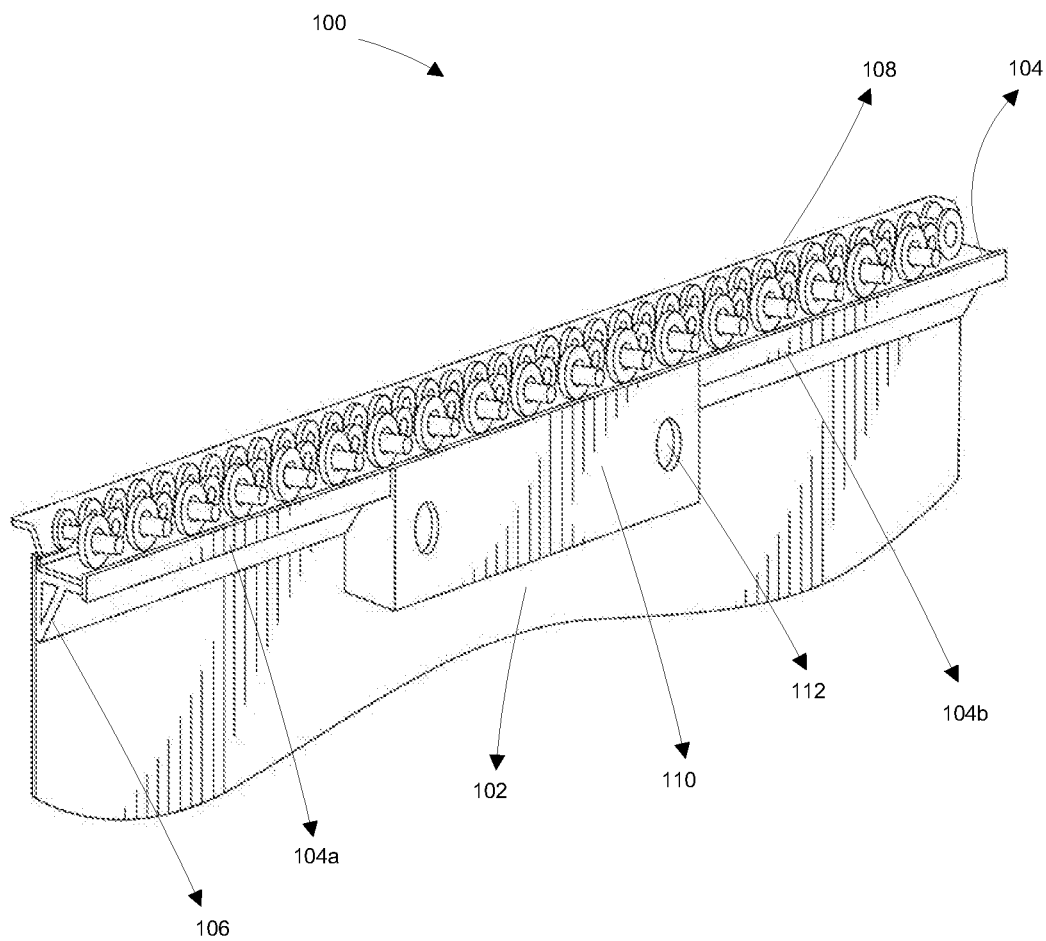
FIG. 1 illustrates a perspective view of the coupling block in accordance with an embodiment of the present subject matter.

Some embodiments of the present disclosure will now be described more fully hereinafter with reference to the accompanying drawings, in which some, but not all embodiments are shown. Indeed, the concepts described here may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

Further, the term "one or more sensors" refers to photo-eye sensors installed on the conveyors at a known position or imaging devices installed above the conveyors. Thus, use of any such terms should not be taken to limit the spirit and scope of embodiments of the present disclosure.

Further, the term "controller" refers to a central or supervisory controller capable of operating other controllers or components associated with the conversion station. The term "controller" may also refer to a motor controller associated with several components of the conversion station. Thus, use of any such terms should not be taken to limit the spirit and scope of embodiments of the present disclosure.

Generally, driving member of a top conveying surface of a conveyor system is installed below the top conveying surface. For example, the driving member may be a continuous chain drive and the top conveying surface may be slats or rollers. Often, the driving member is supported on support structures integral to a conveyor frame of the conveyor system. Generally, the driving member may be continuous and the support structures may be discontinuous. For example, the driving member may be installed on several pieces of support structures distributed on the conveyor frame of multiple conveyor sections of the conveyor system. The support structure of one conveyor frame abut with the support structure of another conveyor frame when the conveyor system is installed. In some examples, several support structures of shorter length may be installed in the same conveyor frame abutting each other in the installed position. Often, due to wear and tear over a period of time, these support structures tend to bend, split and crack, which results in misalignment between the support structures. For example, one support structure may gradually bend and suppress below the other support structure. In some examples, a gap may be formed between the support structures. In some examples, the drive member may not have a smooth transition on the support structures due to the bends and cracks, which in turn may lead to undesirable noise during the operation of the drive member.

Conventionally, the misalignment or the gaps created by the wear and tear of the support structures were corrected by manually removing the drive members and the conveyor frames by unfastening several fasteners and replacing the support structure. In some scenarios, the height of one support structure can be manually adjusted after removing the fasteners to correct the misalignment between the support structures. When such conventional operation of correcting the misalignment or gap in the support structure is performed, the conveyor system may be shut down as it involves manual handling with significant manual labor and time. As the conveyor system is shut down, downtime increase and results in inefficient productivity in the warehouse.

Therefore, various example embodiments described herein in the present disclosure, relates to correcting the misalignment between the support structures using a coupling block installed at multiple conveyor sections of the conveyor system. The coupling block may be installed in between two support structures to compensate for a height difference created between these structures due to wear and tear over a period of time. Further, the coupling block is operated or actuated by rotating cams which can be accessed from outside the conveyor frame and thereby eliminates the requirement for removing or unfastening the drive member or the conveyor frame. In this regard, the downtime of the conveyor system is reduced and productivity is improved in the warehouse.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

FIG. 1 illustrates a perspective view of the coupling block 110 in accordance with an embodiment of the present subject matter. In FIG. 1, a portion of a conveyor side frame 102 of a conveyor system is shown. The conveyor system (not shown) may include two conveyor side frames positioned opposite to each other. In the FIG. 1, an inside view of one of the conveyor side frame 102 is shown. According to an embodiment, the conveyor side frame 102 as shown in FIG. 1 includes multiple support structures 104 extending along a length of the conveyor side frame 102. In some examples, a conveyor side frame (not shown) opposite to the conveyor side frame 102 shown in FIG. 1 may also include multiple support structures 104 extending along a full length of the conveyor side frame 102. In some examples, the support structures 104 may be an extruded plastic wear strip. As shown in FIG. 1, the multiple support structures 104 are supported on a mounting structure 106. In some examples, the mounting structure 106 is an aluminum mount. According to an embodiment, the mounting structure 106 may extend along the full length of the conveyor side frame 102. According to another embodiment, multiple mounting structures 106 may be positioned along the full length of the conveyor side frame 102. The multiple mounting structures 106 and the multiple support structures 104 may be attached to the conveyor side frame 102 in a discontinuous manner. For example, a conveyor system may be formed using a series of individual conveyor sections or conveyor beds, each of the conveyor bed may include one or more support structures 104 spaced apart from each other and attached on the conveyor side frame 102 of the conveyor bed. In some examples, the mounting structures 106 may be integrally formed on the conveyor side frame 102 during manufacture of the conveyor system. In some examples, the mounting structures 106 may be fastened to the conveyor side frame 102 using suitable fasteners 404. In some examples, the support structures 104 may be supported on the mounting structures 106 without any fastening. In some examples, the support structures 104 may be supported on the mounting structures 106 by means of a press fit or using suitable fasteners 404.

According to an embodiment, a driving member 108 is supported on the multiple support structures 104. For example, the driving member 108 may be a continuous drive chain as shown in FIG. 1 and may extend along a full length of the conveyor side frame 102. In some examples, the driving member 108 may be a drive belt. According to an embodiment, the driving member 108 is installed in a continuous manner and the support structures 104 supporting the driving member 108 are installed in a discontinuous manner. For example, the support structures 104 may be spaced apart from each other and the driving member 108 runs across these spaced apart supporting structures 104. According to an embodiment, the driving member 108 may drive a top conveying surface (not shown) of the conveyor system. The top conveying surface may be formed, for example, by conveyor rollers or conveyor slats.

Figure 2:
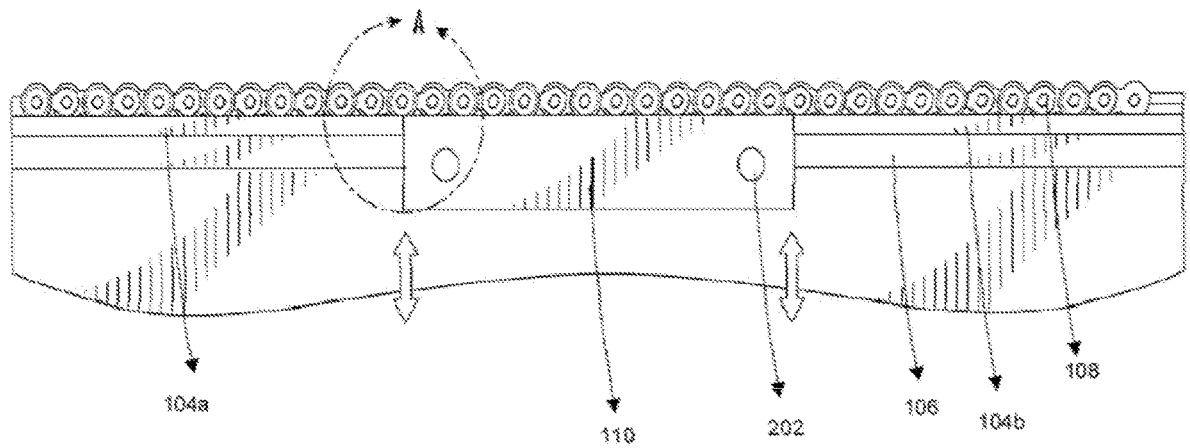
FIG. 2 illustrates a side view of the coupling block viewed from inside of a conveyor frame
Figure 3:
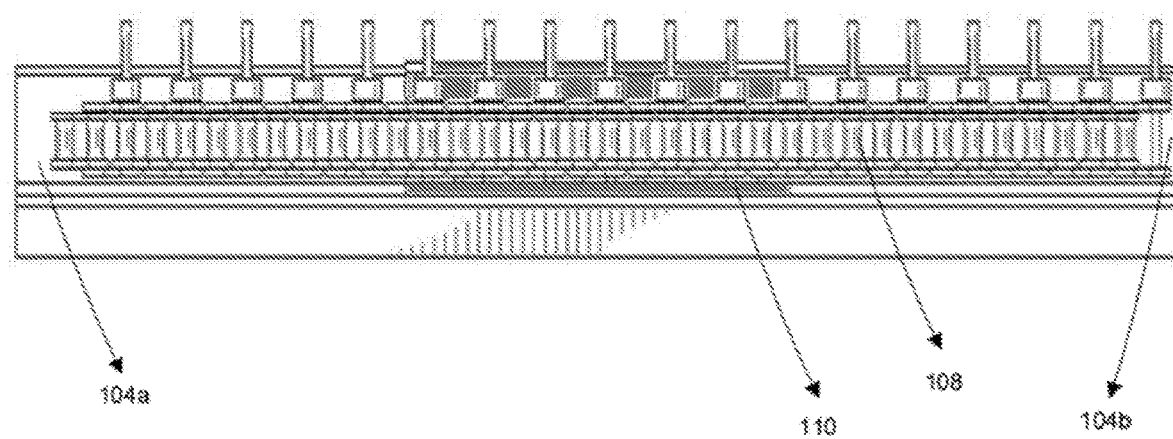
FIG. 3 illustrates a top view of the coupling block viewed from a top of a conveyor frame in accordance with an embodiment of the present subject matter.

According to an embodiment, the conveyor system includes a coupling block 110 positioned in between the multiple support structures 104 to support the driving member 108. The multiple support structures 104 may include a first support structure 104a and a second support structure 104b as shown in the front view of FIG. 2 and the coupling block 110 may be positioned in between the first support structure 104a and the second support structure 104b to support the driving member 108. It is seen in FIG. 2 that the coupling block 110 supports a portion of the driving member 108 running between the first support structure 104a and the second support structure 104b. In some examples, the first support structure 104a and the second support structure 104b may be supported on the same conveyor bed. In some examples, the first support structure 104a may be supported on an upstream conveyor bed and the second support structure 104b may be supported on a downstream conveyor bed and further the coupling block 110 may be positioned in between the upstream conveyor bed and the downstream conveyor bed coupling the first support structure 104a and the second support structure 104b. The driving member 108 may run on the first support structure 104a, the coupling block 110 and the second support structure 104b across conveyor beds as shown in the top view of FIG. 3. In some examples, the coupling block 110 may be attached to the first support structure 104a and the second support structure 104b by a press fit or using suitable fasteners 404. In some examples, the coupling block 110 may be installed in an abutting manner to the first support structure 104a and the second support structure 104b. In some examples, the coupling block 110 may be substantially rectangular in a cross-section.

Figure 4:
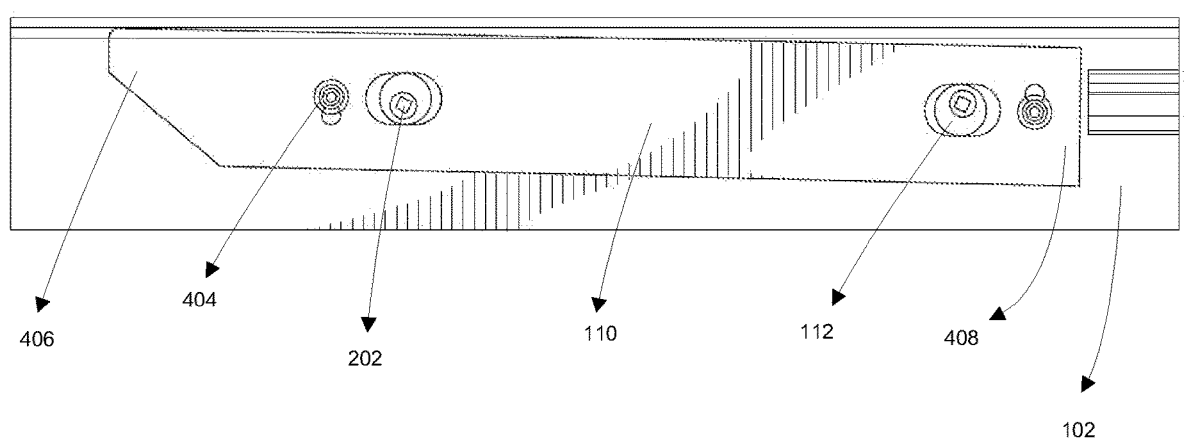
FIG. 4 illustrates a front view of the coupling block viewed from outside of a conveyor frame with one cam adjuster being operational in accordance with an embodiment of the present subject matter.
Figure 5:
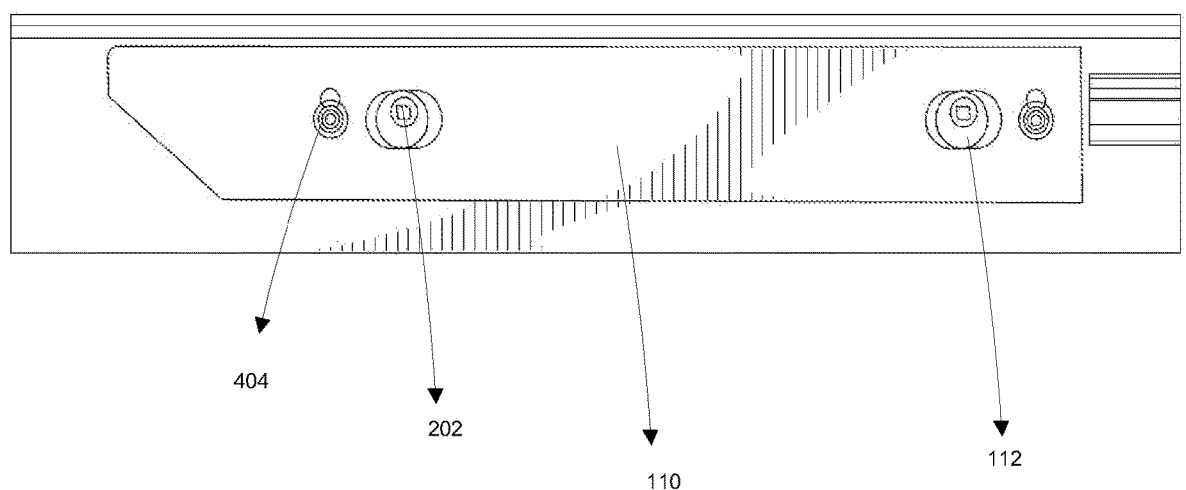
FIG. 5 illustrates a front view of the coupling block viewed from outside of a conveyor frame with both cam adjusters being operational in accordance with an embodiment of the present subject matter.

According to an embodiment, the coupling block 110 includes at least one rotating cam 112 attached to the coupling block 110. In the example embodiment shown FIGS. 1 and 2, it is seen that the coupling block 110 includes two rotating cams 112. FIG. 1 and FIG. 2 depicts a view of the rotating cams 112 from inside of the conveyor side frame 102. The rotating cams 112 are operated using cam adjusters 202 accessible from outside of the conveyor side frame 102. Each of the rotating cam 112 includes one cam adjuster 202 as shown in front view of FIG. 4. In some examples, the coupling block 110 is fastened to the conveyor side frame 102 using suitable fasteners 404, such as, but not limited to a nut, bolt or a washer. In some examples, the conveyor side frame 102 includes slots 402 for accommodating the fasteners 404 and the cam adjusters 202 as shown in FIG. 4. The coupling block 110 may include additional slots corresponding to the slots of the conveyor side frame 102 to receive the fasteners 404 and the rotating cams 112. In some examples, the rotating cams 112 are eccentric rotating cams. The cam adjusters 202 are provided to operate the rotating cams 112 which in turn actuate the coupling block 110. The coupling block 110 can be pivoted or rotated about an axis by the rotating cams 112. FIG. 4 shows an example embodiment of one of the cam adjuster 202 being operational to actuate the coupling block 110. For example, when the second support structure 104b on a downstream end of the conveyor side frame 102 is misaligned with the first support structure 104a at an upstream end of the conveyor side frame 102 due to wear and tear of the support structures 104a, 104b, the coupling block 110 is actuated to compensate for the misalignment. Therefore, when the second support structure 104b may be misaligned by an offset distance below the first support structure 104a, one of the cam adjuster 202 in proximity to the second support structure 104b is rotated is adjusted to rotate the rotating cam 112 in either a clockwise or an anticlockwise direction to tilt the coupling block 110 such that a first end 406 of the coupling block 110 proximal to the first support structure 104a remains at its position and the second end 408 of the coupling block 110 proximal to the second support structure 104b falls down to cover the offset distance between the first support structure 104a and the second support structure 104b to compensate for the misalignment in height. Likewise, FIG. 5 shows an example embodiment in which the cam adjusters 202 are operational to actuate the coupling block 110. For example, when the second support structure 104b and the first support structure 104a at an upstream are moved equally at an offset distance below a pre-installed initial position on the conveyor side frame 102, both the cam adjusters 202 may be operated to rotate the rotating cams 112 in either a clockwise or an anticlockwise direction to move the coupling block 110 vertically down to cover the offset distance from the pre-installed initial position and compensate for the misalignment in the height. Therefore, the coupling block 110 as a follower of the rotating cam 112 and moves the coupling block 110 vertically up or down in response to the rotation of the rotating cam 112. In some examples, the cam adjuster 202 is rotated or actuated using an external motor (not shown) to change a direction of rotation of the rotating cam 112. Therefore, the direction of rotation of the rotating cam 112 may be adjusted to re-position the coupling block 110 to compensate for the height difference between the support structures caused due to wear and tear of the support structures 104a, 104b. In this regard, the coupling block 110 ensures smooth transition of the driving member 108 from the first support structure 104a to the second support structure 104b.

Figure 6:
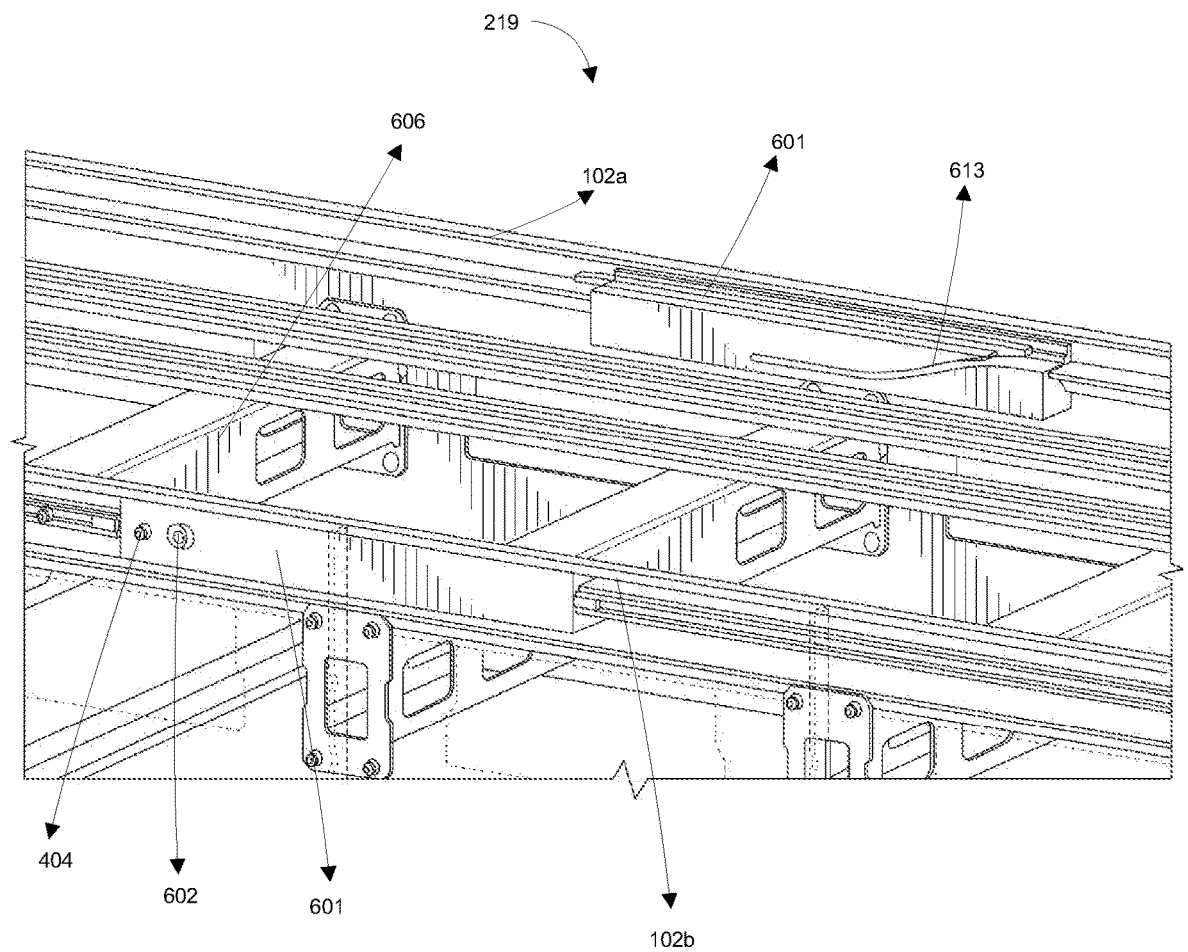
FIG. 6 illustrates a perspective view of the coupling block in accordance with an embodiment of the present subject matter.
Figure 7:
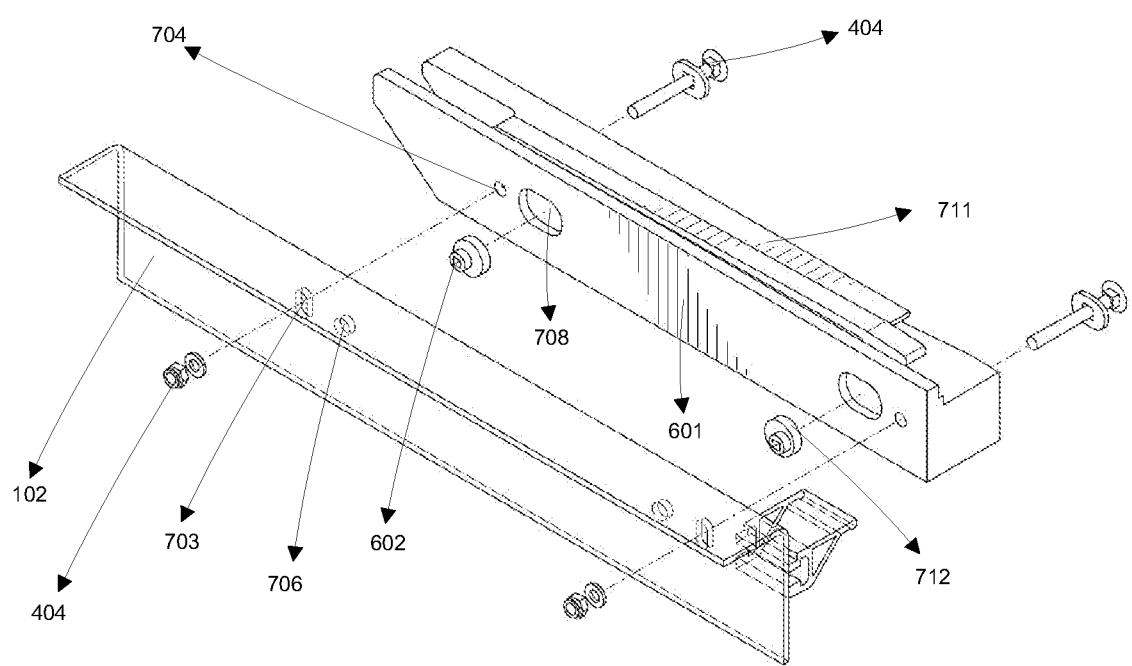
FIG. 7 illustrates an exploded view of the coupling block in accordance with an embodiment of the present subject matter.
Figure 8:
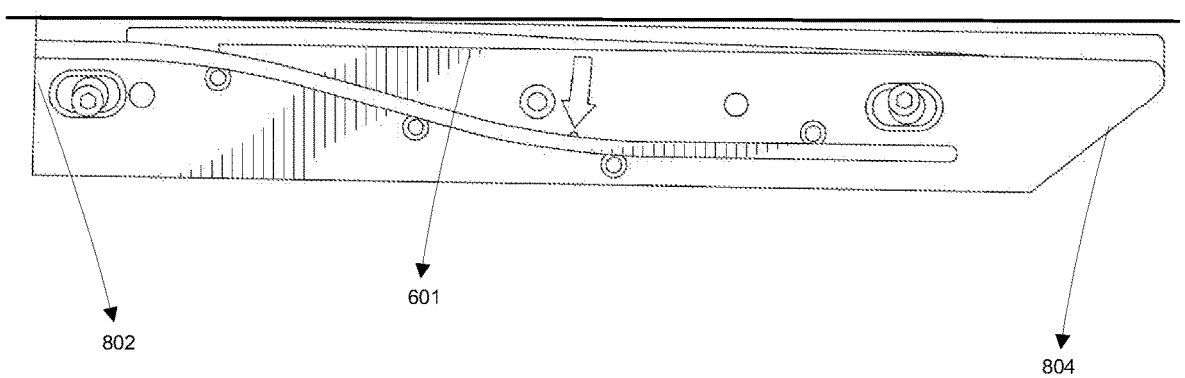
FIG. 8 illustrates a front view of the coupling block with one cam adjuster being operational in accordance with an embodiment of the present subject matter.

FIG. 6 illustrates a perspective view of a coupling block 601 in accordance with an embodiment of the present subject matter. In FIG. 6, the coupling block 601 is shown from an inside of a conveyor bed 600. The conveyor bed includes two conveyor side frames 102a, 102b supported by cross beam 606. The coupling block 601 is installed on both the conveyor side frames 102a, 102b of the conveyor bed 600. For example, the coupling block 110 may be fastened to the conveyor side frames 102a, 102b by suitable fasteners 404, such as, but not limited to nut, bolt or washers. In FIG. 7, an exploded view of the fasteners 404 used for coupling the coupling block 601 to the conveyor side frame 102 is depicted. It is seen from FIG. 7 that the conveyor side frame 102 includes first set of slots 703 to receive the fasteners 404. The coupling block 110 may include a first set of apertures or openings 704 corresponding to the first set of slots 703 to receive the fasteners 404. Further, the conveyor side frame 102 includes a second set of slots 706 to receive the cam adjuster 602 and the coupling block 110 may include a corresponding second set of apertures or openings 708 to receive the rotating cams 712. The rotating cams 712 is positioned within the second set of apertures or openings 708 with a clearance such that the rotating cam 712 is capable of rotation within the apertures 708 in response to actuation of the cam adjuster 602. The first set of slots 703 and the first set of apertures or openings 704, for example, may be linear slots or openings. The second set of slots 706 and the second set of apertures or openings 708, for example, may be substantially circular slots. The cam adjuster 602 protrudes out from the second set of slots 706 such that the cam adjuster 602 may be operated from outside the conveyor side frame 102. As shown in FIG. 7, the coupling block 601 has a top flat surface 711 to support the driving member 108. Further, the coupling block 110 may include a support track 613 as shown in FIG. 8 formed integrally on an inner face of the coupling block 601 to accommodate an end portion of the support structure 104. A width of the support track 613 may be corresponding to a width of the support structure 104. For example, when the first support structure 104a and the second support structure 104b are attached together using the coupling block 110, an end portion of one of the support structure 104a, 104b may be inserted into the support track 613. FIG. 8 illustrates a front view of the coupling block 601 with one cam adjuster 602 being operational to drive the rotating cam 712. It is seen that one of the cam adjuster 602 is actuated from an outer face 715 of the conveyor frame 102 to rotate one of the rotating cam 712 in a clockwise direction or an anticlockwise direction such that a second end 804 of the coupling block 601 is tilted to height below a first end 802 to compensate for a height difference between the support structures 104a, 104b.

Figure 9:
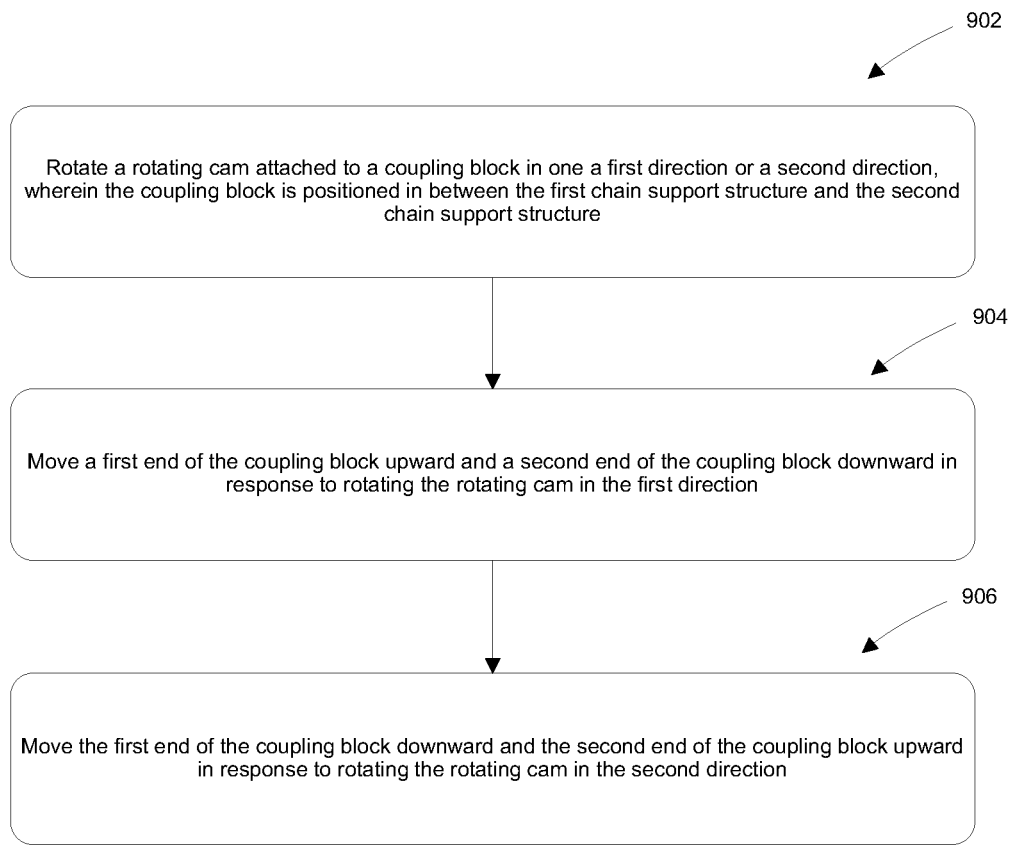
FIG. 9 illustrates a method of using a coupling block for compensating height differences in a conveyor system in accordance with an embodiment of the present subject matter.

FIG. 9 illustrates a method of using the coupling block of FIG. 1 and FIG. 6 for compensating height differences in a conveyor system in accordance with an embodiment of the present subject matter. In some examples, the coupling block may be actuated by an electric motor. The cam adjuster connected to the rotating cam of the coupling block can be operated by the electric motor. In some examples, the conveyor system may include one or more imaging devices or sensors to detect an abnormality in the operation of the conveyor system. The abnormality may indicate that chain support structures of the conveyor system are misaligned. On detecting the abnormality, the one or sensors may transmit an input signal to a central controller to operate the coupling block attached to the support structures. The central controller may be in communication with a motor controller to activate the electric motor to actuate the cam adjuster. In some examples, the one or sensors may transmit an input signal to the motor controller to actuate the cam adjuster. In some examples, the cam adjuster is actuated manually to rotate the coupling block. The cam adjuster is accessible from outside of a conveyor frame of the conveyor system supporting the first chain support structure and the second chain support structure to rotate the rotating cam. At step 902, the cam adjuster rotates the rotating cam attached to the coupling block in one a first direction or a second direction when the coupling block is positioned in between a first chain support structure and a second chain support structure. Depending upon the height difference between the first chain support structure and the second chain support structure, the coupling block is rotated either in the first direction or the second direction. For example, when the first chain support structure is offset at a distance below the second chain support structure, the rotating cam may be rotated in the first direction. For example, when the second chain support structure is offset at a distance below the first chain support structure, the rotating cam may be rotated in the second direction. In some examples, the first direction is a clockwise direction and the second direction is an anti-clockwise direction. At step 904, when the cam adjuster is operated to rotate the rotating cam in the first direction, it causes a first end of the coupling block to rise and a second end of the coupling block to fall. Further, at step 906, when the cam adjuster is operated to rotate the rotating cam in the second direction, it causes the first end of the coupling block to fall and the second end of the coupling block to rise. The rising and falling of the coupling block in response to the rotation of rotating cam compensates the offset distance between the first chain support structure and the second chain support structure. Thus, the misalignment is adjusted dynamically by the coupling block using the cam adjuster accessible from outside the conveyor frame. In this regard, a manual labor of dismantling the conveyor system for compensating the misalignment is eliminated and the noise produced because of the misalignment is reduced and the drive chain smoothly transits from one support structure to the other support structured throughout a full length of the conveyor system.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. A conveyor system comprising:
a conveyor bed, wherein the conveyor bed comprises:
   a conveyor side frame;
   a first support structure and a second support structure that are each attached to the conveyor frame;
   a driving member supported on the first support structure and the second support structure;
      a coupling block positioned in between the first support structure and the second support structure to support the driving member, wherein the coupling block comprises:
         at least one rotating cam attached to the coupling block, wherein the rotating cam is actuated to rotate the coupling block about an axis to compensate for a height difference between the first support structure and the second support structure.

2. The conveyor system of claim 1, wherein the at least one rotating cam comprises a cam adjuster accessible from an outer face of the conveyor side frame.

3. The conveyor system of claim 2, wherein the cam adjuster is configured to rotate the cam in one of a clockwise or anticlockwise direction.

4. The conveyor system of claim 1, wherein the coupling block is configured to move vertically upwards and downwards with respect to one of the first support structure and the second support structure in response to the rotation of the at least one rotating cam.

5. The conveyor system of claim 1, wherein the coupling block is attached to the conveyor side frame using a fastener, wherein the fastener is at least one of a nut, bolt or a washer.

6. The conveyor system of claim 1, wherein the driving member is one of a drive chain or a drive belt.

7. A coupling block to dynamically adjust a difference in height between a first support structure and a second support structure attached to a conveyor frame, wherein the coupling block comprises:
   at least one rotating cam attached to the coupling block, wherein the rotating cam is actuated to move at least a portion of the coupling block about an axis to compensate for a height difference between the first support structure and the second support structure; and
   a cam adjuster accessible from an outer face of the of the conveyor frame to change a direction of rotation of the at least one rotating cam.

8. The coupling block of claim 7, wherein the at least one rotating cam is an eccentric cam with the coupling block as a follower that moves vertically up or down in response to a rotation of the eccentric cam.

9. The coupling block of claim 7, wherein the coupling block includes at least one linear slot and at least one substantially circular slot provided on an outer face of the coupling block.

10. The coupling block of claim 9, wherein the at least one rotating cam is positioned within the substantially circular slot with a clearance such that the cam is capable of rotation within the slot.

11. The coupling block of claim 1, wherein the cam adjuster is actuated using an external motor to change a direction of rotation of the rotating cam.

12. The coupling block of claim 11, wherein the cam adjuster is actuated to rotate the at least one rotating cam in a clockwise direction or an anti-clockwise direction.

13. The coupling block of claim 7, wherein the first support structure and the second support structure supports a driving member.

14. The coupling block of claim 13, wherein the driving member is one of a drive chain, a drive belt or a drive roller.

15. The coupling block of claim 14, wherein the coupling block supports a portion of the driving member when installed in the conveyor frame.

16. The coupling block of claim 7, wherein the coupling block is substantially rectangular in cross section.

17. A method for compensating for a height difference in a first chain support structure and a second chain support structure of a conveyor system comprising:
   rotating a rotating cam attached to a coupling block in one a first direction or a second direction, wherein the coupling block is positioned in between the first chain support structure and the second chain support structure;
   moving a first end of the coupling block upward and a second end of the coupling block downward in response to rotating the rotating cam in the first direction; and
   moving the first end of the coupling block downward and the second end of the coupling block upward in response to rotating the rotating cam in the second direction;
   wherein the upward and downward movement of the coupling block in response to the rotation of rotating cam compensates the height difference between the first chain support structure and the second chain support structure.

18. The method of claim 17, wherein the first direction is a clockwise direction and the second direction is an anti-clockwise direction.

19. The method of claim 17, wherein the rotating the rotating cam further comprises:
   operating a cam adjuster using an external motor to change a direction of rotation of the rotating cam.

20. The method of claim 19, further comprises:
   rotating the cam adjuster from outside of a conveyor frame of the conveyor system supporting the first chain support structure and the second chain support structure to actuate the rotating cam.

* * * * *